United States Patent [19]

Nugent

[11] Patent Number: 5,333,284
[45] Date of Patent: Jul. 26, 1994

[54] REPEATED ALU IN PIPELINED PROCESSOR DESIGN

[75] Inventor: Patrick R. Nugent, Palm Harbor, Fla.

[73] Assignee: Honeywell, Inc., Minneapolis, Minn.

[21] Appl. No.: 965,001

[22] Filed: Oct. 9, 1992

Related U.S. Application Data

[63] Continuation of Ser. No. 580,392, Sep. 10, 1990, abandoned.

[51] Int. Cl.[5] .............................................. G06F 13/00
[52] U.S. Cl. .................................... 395/375; 395/325; 395/800
[58] Field of Search ............ 364/231.8, 948.34, 964.26, 364/DIG. 1, DIG. 2; 395/375, 800, 325

[56] References Cited

U.S. PATENT DOCUMENTS

| | | | |
|---|---|---|---|
| 4,613,935 | 9/1986 | Couleur | 364/200 |
| 4,725,973 | 2/1988 | Matsuura et al. | 364/200 X |
| 4,783,783 | 11/1988 | Nagai et al. | 364/200 X |
| 4,819,155 | 4/1989 | Wulf et al. | 364/200 |

Primary Examiner—Bernarr E. Gregory
Attorney, Agent, or Firm—Whitham & Marhoefer

[57] ABSTRACT

A six-stage pipeline processor comprised of the sequential stages: instruction fetch; instruction decode; first full ALU; second full ALU; Fill Register; and Write Back Register. Memory addresses are calculated in the first ALU stage and this stage presents the address along with a read command to memory at the end of the cycle. Two cycles are allowed for a data response from memory but only one intervening instruction is required to occupy the pipeline for most instruction sequences because bypass logic makes available data operands from memory at the second ALU stage with an apparent load latency of one cycle. Subtraction and other arithmetic operations are performed in the first ALU if the result is to be used by a subsequent LOAD instruction to calculate a memory address so that the result can be used by the first ALU to calculate the memory address without any intervening instruction and potential loss of overall performance.

3 Claims, 5 Drawing Sheets

REPEATED ALU IN PIPELINED PROCESSOR DESIGN

This invention was made with Government support under Contract "F30602-88-C-0060" awarded by Rome Air Development Center, Department of the Air Force. The Government has certain rights in this invention.

This application is a continuation of U.S. Ser. No. 07/580,392, filed Sept. 10, 1990, now abandoned.

BACKGROUND OF THE INVENTION

1. Field of the Invention

The present invention generally relates to digital computers and more particularly to pipeline processing and pipeline processors.

2. Description of the Prior Art

A typical prior art pipeline architecture is shown in FIG. 1. It includes five stages in the pipeline data path. In sequence the pipeline has first an instruction fetch stage into which an instruction on the instruction bus is strobed during each pipeline processor clock cycle. Next is an instruction decode stage in which the instruction read into the instruction fetch register is decoded during the next clock cycle. An ALU stage is next. It executes the decoded instruction during the next clock cycle. The ALU is used to calculate arithmetic results (including comparison of operands for conditional branch) and to calculate memory addresses as, for example, in the case of a load word from memory instruction. The number of cycles which must intervene before the load operand from the memory store is available for use in a subsequent instruction is called load latency, and is a function of the access time of the memory. Systems usually have a load latency of no more than one clock cycle. Code optimization support software can often fill a single latency cycle with a useful instruction.

The next stage is a fill stage to accommodate a one-cycle data fetch load latency. It provides a register through which data moves in a single cycle so that all instructions can be processed in the same number of steps regardless of whether or not the instruction requires a memory access. The final stage in the pipeline is a write back stage. It takes one cycle.

Bypass logic allows data in the pipeline to be used in the execution of subsequent instructions before the data reaches the final stage. An operand register associated with the ALU stores operands for ALU operations.

The prior art recognizes that a major impediment to pipelined computer efficiency is the fact that the instruction decode is often followed by address preparation. This sequence takes approximately the same time as the instruction fetch, thus causing the operand fetch to occur just when it would be desirable to initiate the next instruction fetch for effective pipeline operation. In addition to fetch cycles conflicting, the address preparation and execution cycles also conflict.

U.S. Pat. No. 4,613,935 ('935) describes the use of two ALUs so that address preparation does not have to wait for instruction execution or vice versa as one solution to the problem. In the '935 patent there is no suggestion of using the additional ALU for any function other than address calculation.

In certain systems the memory access has a load latency of two clock cycles. It is not practical to fill two load latency cycles with useful instructions so that with a load latency of two cycles there are an excessive number of no-operation instructions which reduce the overall efficiency of the pipeline operation. Prior art proposals for adding an address calculation adder stage ahead of the ALU in the pipeline are not altogether satisfactory. For example, the results of a subtract instruction, or other arithmetic or logical operation, may be necessary in order to calculate a memory address in the execution of a subsequent LOAD instruction. If subtraction is performed in the ALU stage of the pipeline the result will not be available for the next LOAD instruction until after a one-cycle delay. Similarly, with respect to conditional branch instructions, a comparison of operands must be made as soon as possible in order to minimize delay caused by the pipeline.

SUMMARY OF THE INVENTION

An object of this invention is the provision of an improved pipeline processor for executing LOAD/STORE instructions in which there is a memory load latency of two cycles; a pipeline processor which has an apparent load latency of one cycle.

Briefly, a specific embodiment of the invention contemplates the provision of a six-stage pipeline processor comprised of the sequential stages: instruction fetch; instruction decode; first full ALU; second full ALU; Fill Register; and Write Back Register. Memory addresses are calculated in the first ALU stage and this stage presents the address along with a read command to memory at the end of the cycle. Two cycles are allowed for a data response from memory but only one intervening instruction is required to occupy the pipeline for most instruction sequences because bypass logic makes available data operands from memory at the second ALU stage with an apparent load latency of one cycle. Subtraction and other arithmetic operations are performed in the first ALU if the result is to be used by a subsequent LOAD instruction to calculate a memory address so that the result can be used by the first ALU to calculate the memory address without any intervening instruction and potential loss of overall performance.

DETAILED DESCRIPTION OF A PREFERRED EMBODIMENT OF THE INVENTION

Figure 1:
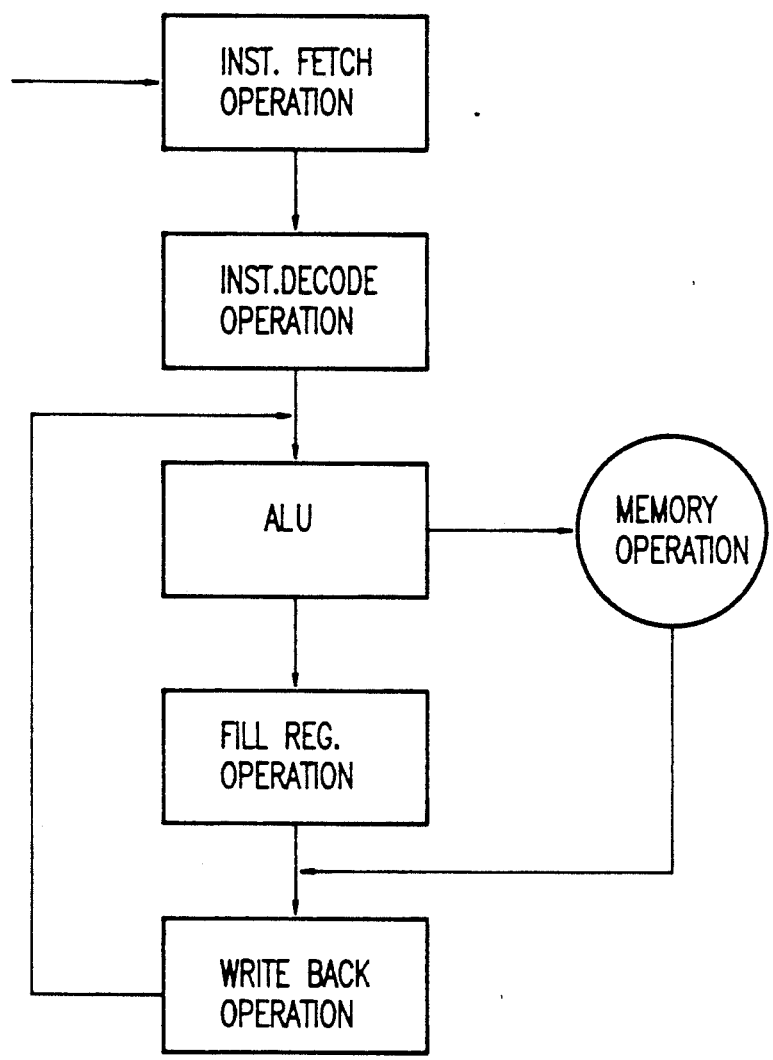
FIG. 1 is a block diagram of a typical pipeline processor used in the prior art with a one-cycle load latency.
Figure 2:
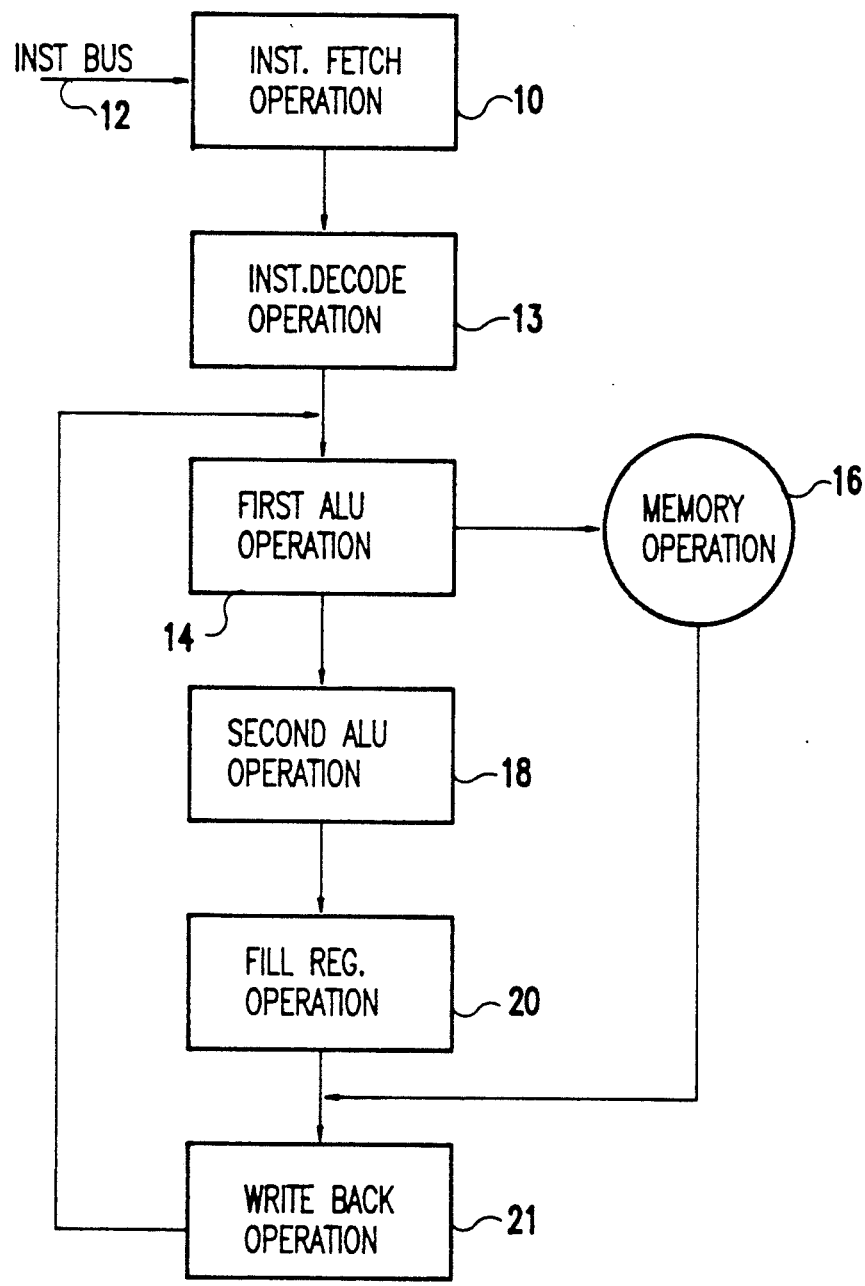
FIG. 2 is a block diagram of a pipeline processor in accordance with the teachings of this invention.

Referring now to the drawings, FIG. 1 has been explained in connection with the background of the invention and will not be repeated here. FIG. 2 shows a pipeline processor in accordance with the teachings of this invention. It has a first stage 10 (Instruction Fetch) which reads an instruction on instruction bus 12 during a single clock cycle; it reads a new instruction in cycles n, n+1, n+2, n+3, etc. A second stage 13 (Instruction Decode) decodes the instruction from the previous stage in a single clock cycle and decodes on a new instruction in cycles n+1, n+2, n+3, etc. The next stage is a full ALU stage 14 (First ALU) which performs an arithmetic operation in a single clock cycle. For a LOAD instruction, this First ALU 14 calculates a memory address during a single clock cycle and presents the address and a read command to a memory 16. The respond time of the memory 16 is two clock cycles. It will be appreciated that this two-cycle load latency may come about as a result of either a relatively slow memory or a fast pipeline clock or a combination of both.

A second full ALU 18 (Second ALU) follows the first and is capable of performing the same operations as the first ALU during a single clock cycle. The second ALU 18 executes the same instruction as the first ALU one clock cycle later but not necessarily on the same operands. A load latency fill stage 20 (Fill Reg.) provides data storage for one-clock cycle. The final stage of the pipeline is a Write Back to operand file stage 21. Write Back stage 2 operates in a single clock cycle.

As will be explained in more detail in connection with FIG. 3, bypass logic couples various stages of the pipeline and the Memory Address Register 50 data available in the pipeline may be used in execution of subsequent instructions prior to completion of the pipeline sequence.

Figure 3:
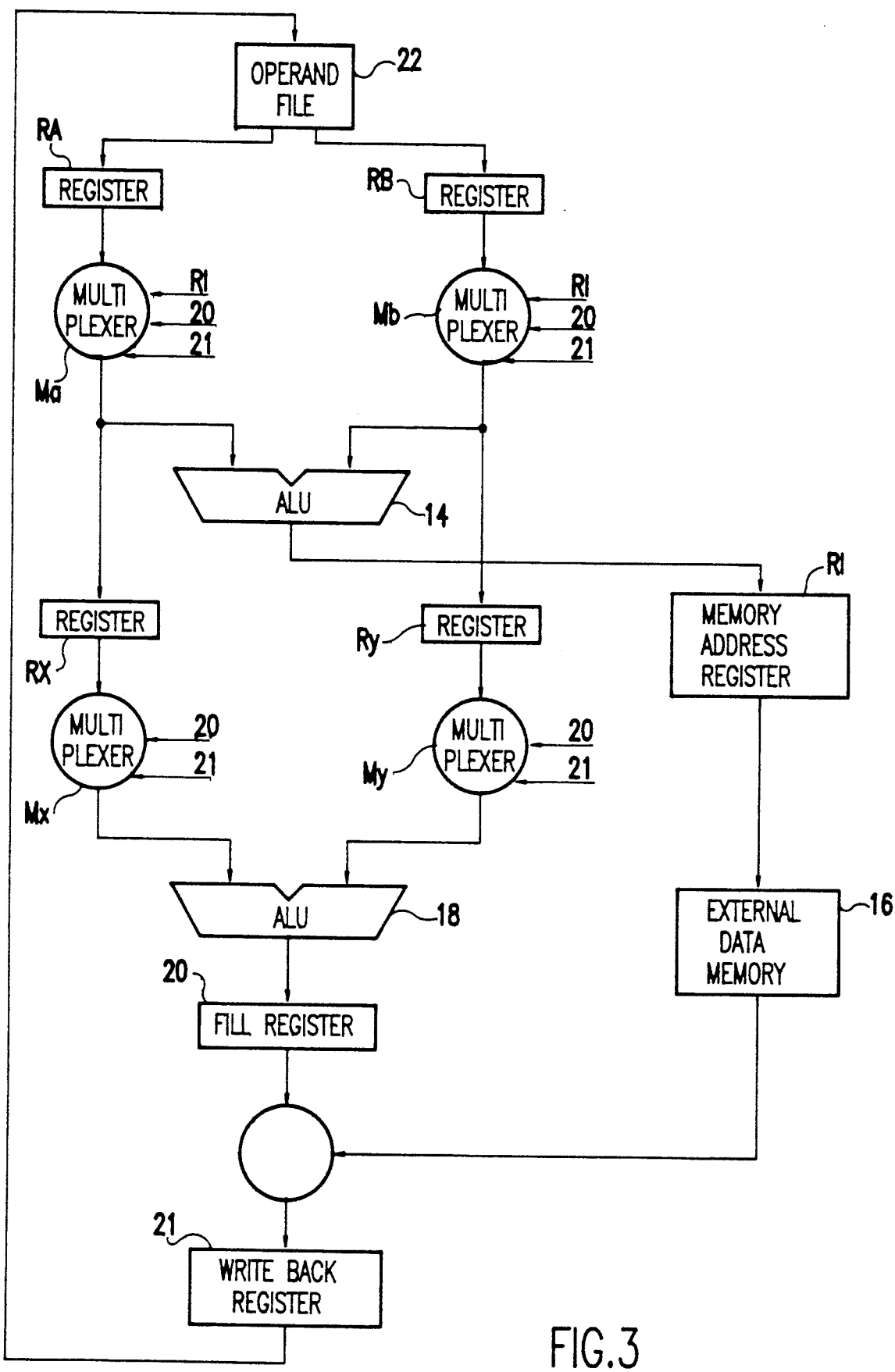
FIG. 3 shows the system of FIG. 2 in additional detail.

Referring now to FIG. 3, in which the stages Instruction Fetch and Instruction Decode have been omitted to simplify the explanation of the invention, each of the ALUs 14 and 18 have associated therewith a pair of registers; registers Ra and Rb are coupled to ALU 14 and registers Rx and Ry are coupled to ALU 18. An operand file 22 is coupled to the inputs of both sets of registers (Ra−Rb and Rx−Ry) and provides the inputs to the ALUs in the absence of a bypass operation. In addition to the registers Ra, Rb, Rx, and Ry, each of the ALUs has a pair of bypass multiplexers labeled respectively Ma, Mb, for the multiplexers coupled to ALU 14 and Mx and My for the multiplexers coupled to ALU 18. The multiplexers Ma and Mb selectively can couple to ALU 14 the contents of a Memory Address Register R1, Fill Register 20 and Write Back Register 21 in response to a bypass command, or the contents of registers RA and RB in the absence of a bypass command. Similarly, multiplexer Mx and My can couple to the ALU 18 the contents of Fill Register 20 and Write Back Register 21 in response to a bypass command. Data from external memory 16 is available to Write Back Memory 18 two clock cycles after a memory command from ALU 14.

The operation of a pipeline processor in accordance with the teaching of this invention will now be explained in connection with FIG. 4 which illustrates the pipeline process for an instruction sequence;

(1) SUBTRACT .r1−.r2→.r3
(2) LOAD .r5 from address (.r4+.r3)
(3) NO OPERATION
(4) ADD .r5+.r4→.r3

Figure 4:
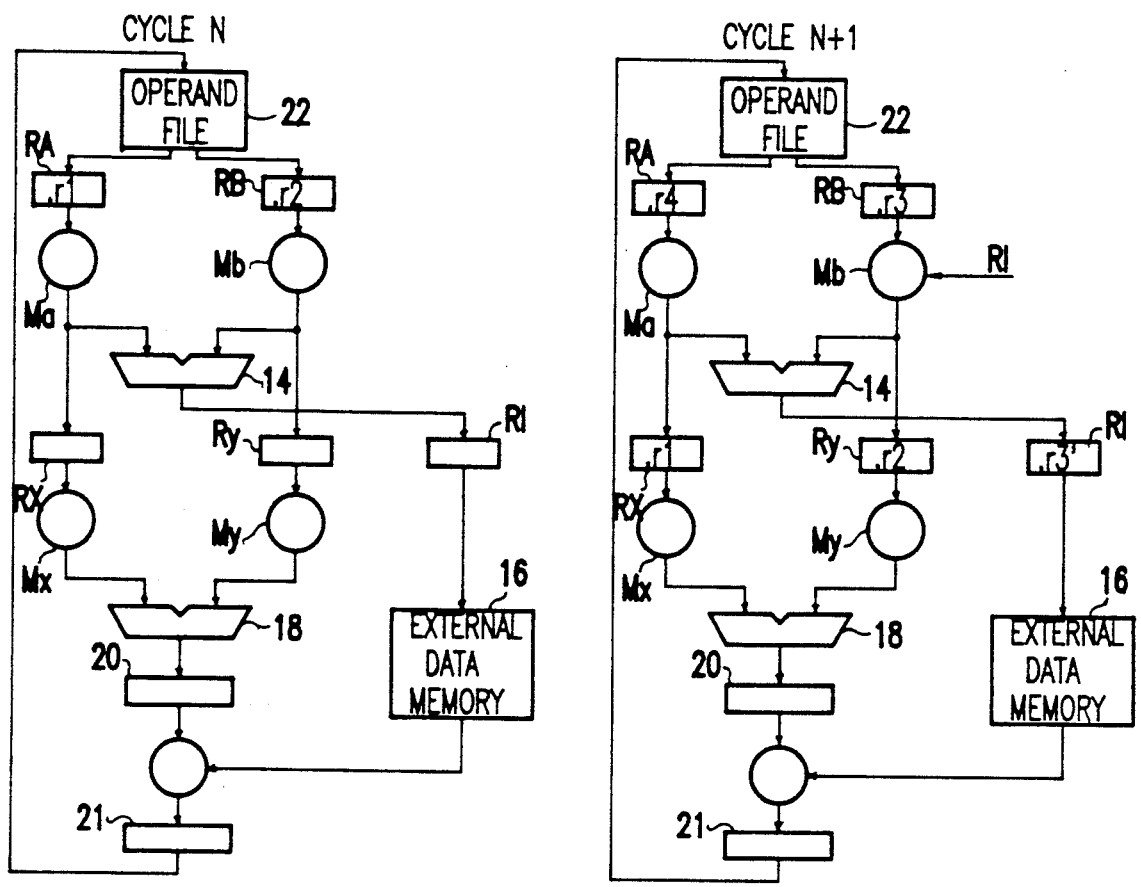
FIGS. 4 and 4A illustrate the operation of the invention in executing an exemplary code sequence.
Figure 4A:
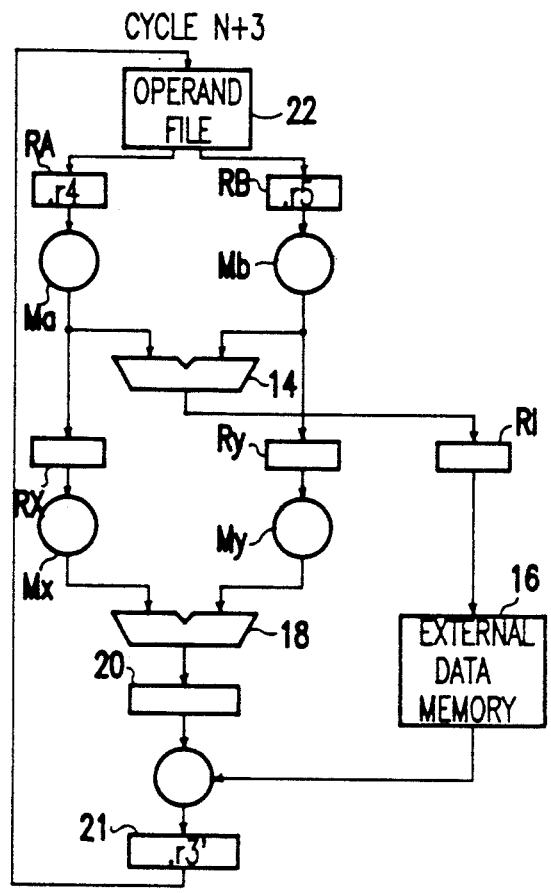
Figure 4A:
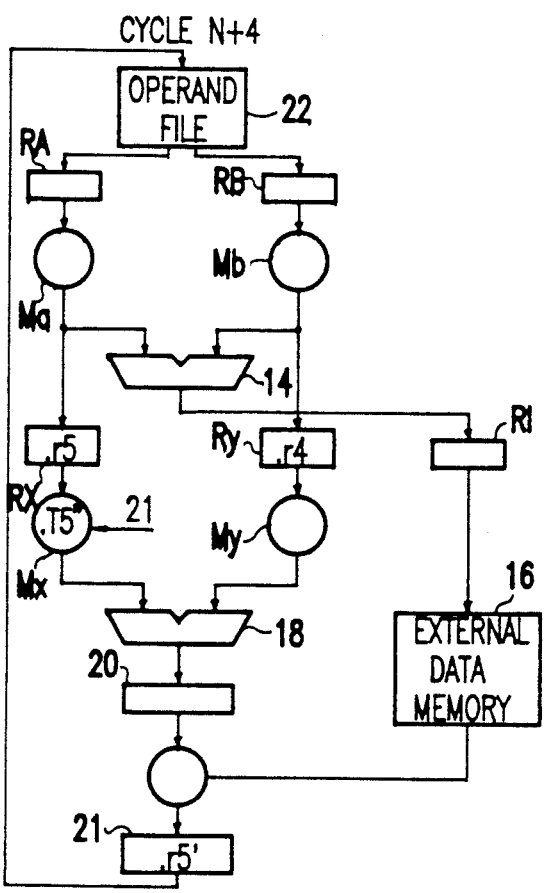

FIG. 4 shows the register contents in executing this sequence in a series of drawings labeled Cycle N, Cycle N+1, Cycle N+2, Cycle N+3, and Cycle N+4. Bypass occurs in cycles N+1 and N+4. For simplicity the DATA FETCH and DECODE operations have been omitted.

In cycle N, in response to the instruction SUBTRACT .r1−.r2→.r3, the registers Ra and Rb are loaded with operands from locations .r1 and .r2 from the operand file 22.

In cycle N+1 the result of the subtract operation .r3' performed in ALU 14 is stored in Memory Address Register R1. As a result of the LOAD .r5 instruction operands .r4 and .r3 are loaded into registers RA and RB from the operand file 22. During cycle N+1, .r1 .r2 are transferred into registers Rx and Ry. Here it should be noted that the subtraction result .r3' has not yet been formed by the second ALU 18. The result of the subtraction operation .r3' stored in Memory Address Register R1 is bypassed via multiplexer Mb to the input of ALU 14 for use in the .r5 address calculation as .r3' is the current value.

The next instruction in this example is a no-operation instruction and no data is transferred to registers Ra and Rb during cycle N+2. It will be appreciated that in actual practice this no-operation instruction may be replaced by a useful instruction so long as it provides a one-cycle delay for memory load latency. During this cycle the second ALU 18 calculates result .r3' and it is stored in Fill register 20. The first ALU 14 calculates the sum of .r4 and .r3' and stores it in the Memory Address Register R1 to obtain .r5' from memory.

In cycle N+3, the operands .r5 and .r4 are written into ALU 14 registers Ra and Rb respectively in response to the ADD .r5+.r4 instruction. The result .r3' from ALU 18 is transferred to the Write Back Register 21.

In cycle N+4 the result .r3' is written into the Operand Register 22. The data .r5', which is the current value of .r5 and which was addressed from memory at N+2, is written into Write Back Register 21 at N+4. Bypass multiplexer Mx couples .r5' to one input of ALU 18 so that it is available for the ALU 18 to perform the operation ADD .r5'+.r4 during the next cycle, N+5.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A pipeline processor for executing a sequence of instructions, including main memory LOAD/STORE instructions, the combination comprising:

a main memory with a load latency of two clock cycles;

a first ALU for executing add instructions, subtract instructions; and conditional branch instructions;

a first ALU operand register for coupling operands to said first ALU for execution;

said first ALU executing a first instruction during a first clock cycle on a first operand coupled to said first ALU from said first ALU operand register;

means for coupling an output of said first ALU to said main memory;

a second ALU for executing add instructions, subtract instructions, and conditional branch instructions;

a second ALU operand register for coupling operands to said second ALU for execution;

said second ALU executing said first instruction, during a second clock cycle, on said first operand coupled to said second ALU from said second ALU operand register; and means for coupling an output of said second ALU to said first ALU operand register in a way that bypasses said main memory and provides the result of an execution of said first instruction on said first operand by said second ALU as an operand to said first ALU after a latency of one clock period.

2. A pipeline processor as in claim 1 the combination further comprising;

a main memory address register;
a operand register;
a load latency fill register;
a write back register;
first bypass logic means for selectively coupling to said first ALU an operand from said main memory address register, said operand register, said fill register, and said write back register.

3. In a pipeline processor as in claim 1 the combination further comprising;
a main memory address register;
a operand register;
a load latency fill register;
a write back register;
first bypass logic means for selectively coupling to said first ALU an operand from said main memory address register, said operand register, said fill register, and said write back register; and
second bypass logic means for selectively coupling to said second ALU an operand from said operand register, said fill register, and said write back register.

* * * * *